No. 842,639. PATENTED JAN. 29, 1907.
P. EMDEN.
STUFFING JOINT FOR ROTARY SHAFTS.
APPLICATION FILED DEC. 4, 1905.
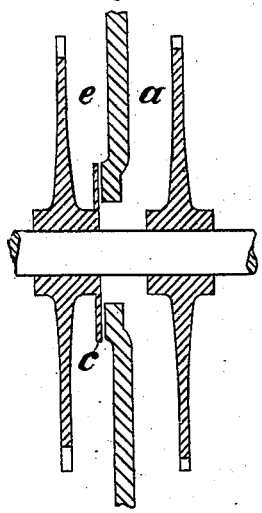
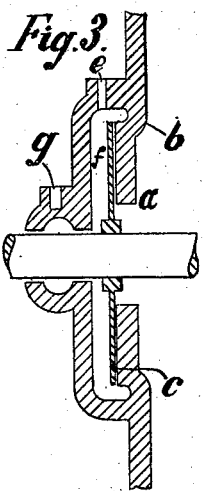
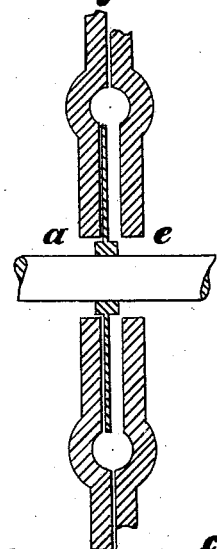
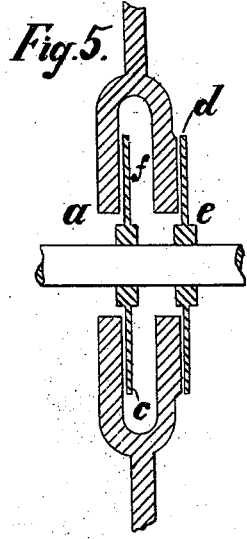
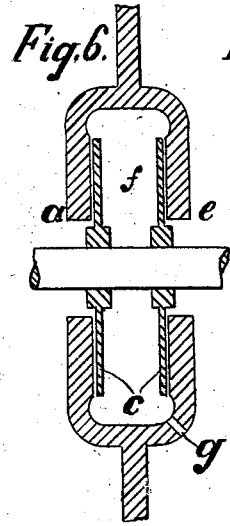
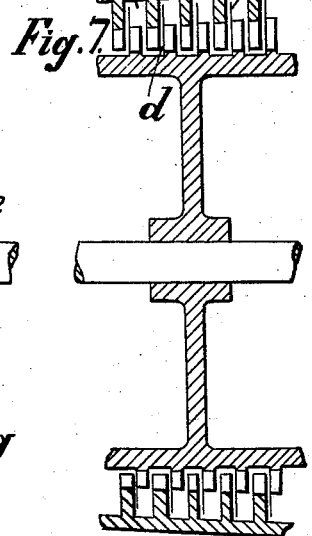
WITNESSES:
George Hulsberg.
Edward Niemer
INVENTOR
Paul Emden
BY W. C. Hauff
ATTORNEY

UNITED STATES PATENT OFFICE.

PAUL EMDEN, OF ST. GALL, SWITZERLAND.

STUFFING-JOINT FOR ROTARY SHAFTS.

No. 842,639.     Specification of Letters Patent.     Patented Jan. 29, 1907.

Application filed December 4, 1905. Serial No. 290,222.

*To all whom it may concern:*

Be it known that I, PAUL EMDEN, a citizen of Switzerland, residing at St. Gall, Switzerland, have invented new and useful Improvements in Stuffing-Joints for Rotary Shafts, of which the following is a specification.

This invention serves for tightening the joints of shafts or axles in pressure or vacuum chambers of machines, such as steam or gas turbines, at the point of passage from one chamber into another or into the atmosphere, so that the least possible loss of gas or steam will occur.

This invention is set forth in the following specification and claims and illustrated in the annexed drawings, in which—

Figure 1 shows a tube with a flange and plate. Fig. 2 shows a stuffing-joint. Figs. 3 and 4 show modified forms of joints. Fig. 5 shows joints in series. Figs. 6 and 7 show modifications.

The usual stuffing-boxes for piston-rods will not answer for rotary shafts, as the packing cannot be sufficiently lubricated. In the herein-described packing lubrication by oil is obviated, as there is no friction of solid bodies upon one another. The packing is based upon the well-known fact that air passing out of an opening in a plate under certain conditions does not repel, but attract a disk held thereagainst.

If a tube $a$, Fig. 1, is provided at an end with a fixed flange $b$, a plate $c$, placed in front of the outlet, is attracted thereto as soon as gas or steam flows out of the tube in the direction of the arrow. The plate does not come to rest at the flange, but between the two there remains a small space or gap $d$, which allows the passage or escape of a small amount of gas or steam.

In consequence of the cross-section of the gap increasing as the flange radius enlarges an expansion below that of atmospheric pressure takes place during the flow through such gap. The air-pressure on the outside of the plate overbalances the inner pressure and forces the plate against the flange. Fig. 2 shows an application of this principle in the shape of stuffing-joint for a steam-turbine with several stages of different pressures. The chamber $a$ has a higher pressure than the chamber $e$. The two are separated by a partition $b$. The shaft passing through the partition $b$ carries the disk $c$, which is pressed against said partition in the above-described manner, and thus effects a nearly perfect closure between chambers $a$ and $e$.

Fig. 3 shows the invention applied to a shaft passing from a pressure-chamber into the atmosphere. The letter $a$ indicates the pressure space or chamber. $b$ is the wall or head through which the shaft passes, and $c$ is the joining-disk. The disk $c$ is housed in a chamber $f$, which by an opening $e$ communicates with a chamber of lower pressure or with the condenser. To prevent air entering chamber $f$, steam under atmospheric pressure can be made to enter at a suitable entrance or port, as $g$.

Fig. 4 shows a form of construction in which the greater pressure can be either at the space $a$ or at the space $e$, the disk being always forced toward the higher pressure.

Fig. 5 shows several joints arranged in series on the plan of Fig. 2.

If the difference in pressure between two chambers is very small, the joint, as described before, will not suit the purpose, but can be made to act by an arrangement, as shown in Fig. 6. The wall between the spaces $a$ and $e$ forms a little chamber $f$ around the shaft. In this chamber a gas or steam pressure is introduced at $g$, being considerably lower or higher as the pressure in $a$ or $e$, the chamber being closed against $a$ and $e$ in the usual way by the disks $c$. The latter are placed on the inside of the chamber if the pressure is lower and on the outside if the pressure is higher, as in $a$ and $e$.

Fig. 7 shows the invention applied for diminishing the losses at the gaps between rows of blades. In this case gap $d$ and chambers $e$ are spaces with different pressure and between which the disk $c$ at the row or ring of propelling-plates forms the packing or joint.

Vacuum spaces or chambers can be closed against atmospheric air in a similar manner, as described in Fig. 3.

The invention can also be used for tightening balance-pistons in place of the labyrinth-packings usually employed in reaction turbines.

The surfaces of the elements $b$ and $c$ may be of any suitable shape, and the said elements can be set up in any suitable manner.

What I claim as my invention, and desire to secure by Letters Patent, is—

1. An automatic stuffing-joint comprising surfaces one of which is axially movable and which surfaces are adapted for the expansion of steam or gas passing the space therebetween in a radially-outward direction so that the pressure on the outside of the surfaces becomes greater than the pressure between the same whereby the surfaces are drawn or pressed together to leave but a slight escapement or gap.

2. A stuffing-joint comprising chambers with a wall or partition, a shaft passing through the wall and a movable disk adapted to be pressed against the wall by unequal pressure in the chambers.

3. A stuffing-joint comprising chambers with a wall or partition, a shaft, and a movable disk carried by the shaft and adapted to be drawn to or close the wall by unequal pressure at opposite sides thereof.

4. A cylinder or vacuum-chamber having a second chamber communicating with steam or atmospheric pressure, a shaft and a movable disk on the shaft adapted to be held or moved to the wall between the cylinder and the second chamber by the unequal pressure between both.

5. A cylinder or pressure-chamber having a second chamber communicating with a condenser or space of lower pressure than the cylinder, a shaft, and a movable disk on the shaft, said second chamber having an entrance for air or steam at atmospheric or nearly atmospheric pressure.

6. A stuffing-joint comprising a wall forming a small chamber or cylinder, a shaft passing the cylinder, the chamber connected with a space of pressure higher or lower than the pressures outside of the chamber, and two movable disks on the shaft adapted to be pressed against the walls of the chamber in opposite directions.

7. A stuffing-joint comprising a wall forming a small chamber or cylinder, a shaft passing through the cylinder, and two movable disks carried by the shaft and adapted to be drawn to the walls of the chamber in the same direction.

In testimony whereof I have hereunto set my hand in the presence of two subscribing witnesses.

PAUL EMDEN.

Witnesses:
KURT E. W. MEYER,
E. P. WAGNER.